US012654233B2

(12) United States Patent
Hornung

(10) Patent No.: US 12,654,233 B2
(45) Date of Patent: Jun. 16, 2026

(54) CLAMPING SHANK FOR A TOOL AND TOOL COMPRISING THE CLAMPING SHANK

(71) Applicant: Ottmar Hornung, Bermatingen (DE)

(72) Inventor: Ottmar Hornung, Bermatingen (DE)

(73) Assignee: Ottmar Hornung, Bermatingen (DE)

( * ) Notice: Subject to any disclaimer, the term of this patent is extended or adjusted under 35 U.S.C. 154(b) by 584 days.

(21) Appl. No.: 18/042,306

(22) PCT Filed: Jul. 29, 2021

(86) PCT No.: PCT/EP2021/071335
§ 371 (c)(1),
(2) Date: Feb. 21, 2023

(87) PCT Pub. No.: WO2022/042999
PCT Pub. Date: Mar. 3, 2022

(65) Prior Publication Data
US 2023/0311216 A1 Oct. 5, 2023

(30) Foreign Application Priority Data

Aug. 25, 2020 (DE) .......................... 102020122179.7

(51) Int. Cl.
*B23B 31/00* (2006.01)
*B23B 51/00* (2006.01)
*B23G 5/06* (2006.01)
(52) U.S. Cl.
CPC ............ *B23B 31/005* (2013.01); *B23B 51/00* (2013.01); *B23B 2231/0244* (2013.01); *B23G 5/06* (2013.01)

(58) Field of Classification Search
CPC .................. B23B 51/00; B23B 31/005; B23B 2231/0244
See application file for complete search history.

(56) References Cited

U.S. PATENT DOCUMENTS

| | | | | |
|---|---|---|---|---|
| 2,635,660 A | * | 4/1953 | Dawson ................. | B25G 1/063 81/436 |
| 3,994,615 A | | 11/1976 | Narang | |
| 4,702,328 A | * | 10/1987 | McSweeney ........... | E21B 17/03 175/320 |

(Continued)

FOREIGN PATENT DOCUMENTS

| | | | | |
|---|---|---|---|---|
| DE | | 3413432 A | * | 7/1985 |
| DE | | 19507213 A1 | | 9/1996 |

(Continued)

*Primary Examiner* — Nicole N Ramos
(74) *Attorney, Agent, or Firm* — SPL Patent Attorneys PartG mbB; Yong Beom Hwang

(57) ABSTRACT

A clamping shank for a tool for clamping the tool into a rotary driving clamping device is proposed. The clamping shank comprises a circular shank portion and a pentagonal shank portion adjoining the circular shank portion. Four contiguous side faces of the pentagonal shank portion each form an angle of 90° to each other in a plane perpendicular to the longitudinal axis of the clamping shank. A fifth side face of the pentagonal shank portion forms in said plane angles of greater than 90° with each of the adjacent side faces of the pentagonal shank portion.

7 Claims, 2 Drawing Sheets

100

(56)                    References Cited

U.S. PATENT DOCUMENTS

| | | | | |
|---|---|---|---|---|
| 4,786,062 | A | * | 11/1988 | Schneider ................. B25B 5/14 |
| | | | | 269/287 |
| 5,074,025 | A | * | 12/1991 | Willard, III ........... B23B 31/005 |
| | | | | 29/525 |
| 6,172,319 | B1 | * | 1/2001 | Franzen ................... B23H 7/26 |
| | | | | 219/69.15 |
| 2006/0048615 | A1 | | 3/2006 | Treige |
| 2018/0326508 | A1 | | 11/2018 | Jiang et al. |

FOREIGN PATENT DOCUMENTS

| | | | | |
|---|---|---|---|---|
| DE | 102007042473 | A1 | | 3/2009 |
| DE | 102018006402 | A1 | | 2/2019 |
| GB | 755622 | A | * | 8/1956 ........... B23B 31/005 |

\* cited by examiner

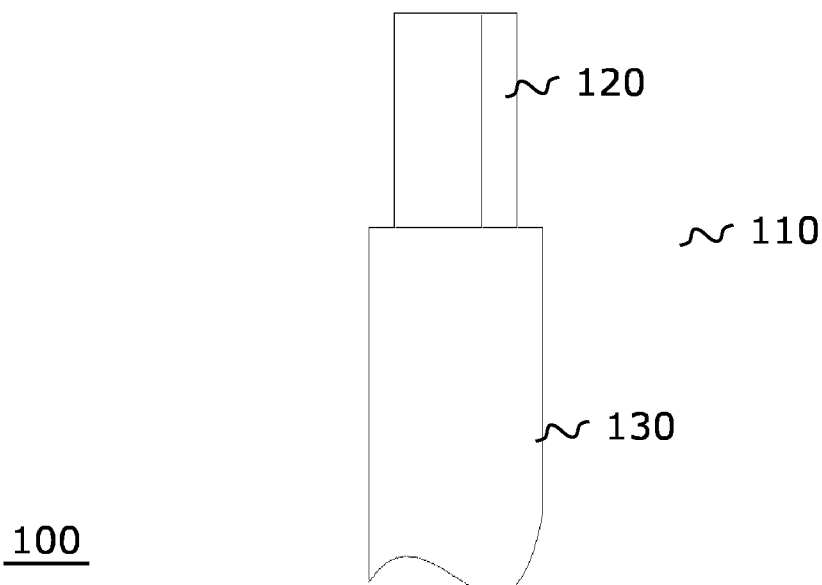
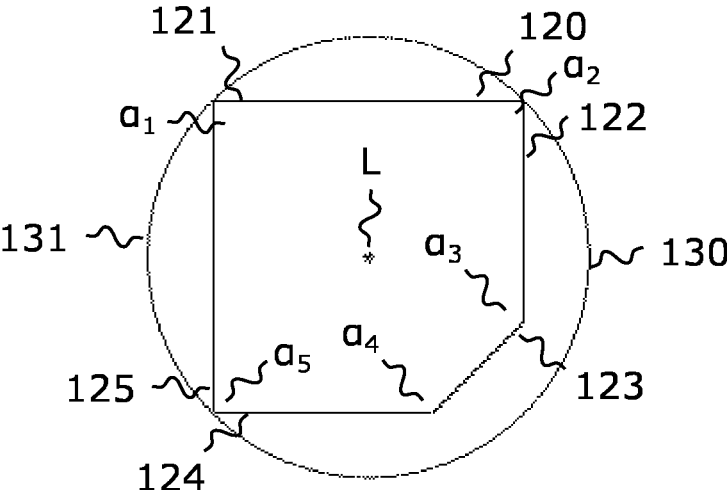
Fig. 1
Fig. 2

CLAMPING SHANK FOR A TOOL AND TOOL COMPRISING THE CLAMPING SHANK

TECHNICAL FIELD

The present invention relates to the clamping of tools. In particular, the present invention relates to a clamping shank for a tool and to a tool comprising the clamping shank.

BACKGROUND

Rotary driven tools, such as taps, have a shank that may be clampable into a rotary driving tool holder so that the torque provided by the rotary driving clamping device may be applied to the tool.

Various shank types are known for tool clamping. For example, a shank with a circular portion and an adjoining square portion is known for taps. For drilling and threading tools, for example, a hexagonal shank is known. Also known is a shank with a circular portion and an adjoining triangular portion.

Depending on the shank type, the tool may thus be clamped into a tool holder such as a three-jaw chuck, a four jaw chuck, a tap wrench, a bit holder or a lathe chuck.

The disadvantage of known shank types, however, is that they usually only allow the tool to be clamped into a specific type of tool holder.

Thus, there may be demand for providing an improved clamping shank for a tool that allows the tool to be clamped into various rotary driving clamping devices.

ABSTRACT

The demand may be satisfied by the subject matter of the claims.

One embodiment relates to a clamping shank for a tool for clamping the tool into a rotary driving clamping device. The clamping shank comprises a circular shank portion and a pentagonal shank portion adjoining the circular shank portion. Four contiguous side faces of the pentagonal shank portion each form an angle of 90° to each other in a plane perpendicular to the longitudinal axis of the clamping shank. A fifth side face of the pentagonal shank portion form in said plane angles of greater than 90° with each of the adjacent side faces of the pentagonal shank portion.

Another embodiment relates to a tool. The tool comprises a clamping shank according to the invention and a tool head for material processing adjoining the clamping shank.

Due to the circular shank portion and the pentagonal shank portion, the clamping shank according to the invention enables the tool to be clamped into various rotary driving clamping devices, in particular by a corresponding design of the pentagonal shank portion. For example, due to the clamping shank according to the invention, the tool may be clamped into a round chuck, a three-jaw chuck as well as a four jaw chuck. The clamping shank according to the invention thus allows the tool to be used universally.

BRIEF DESCRIPTION OF THE FIGURES

Some examples of devices and/or methods will be described in the following by way of example only and with reference to the accompanying figures, in which:

FIG. 1 shows a side view of an embodiment of a tool;

FIG. 2 shows a top view of an embodiment of a tool; and

DESCRIPTION

Figure 3:
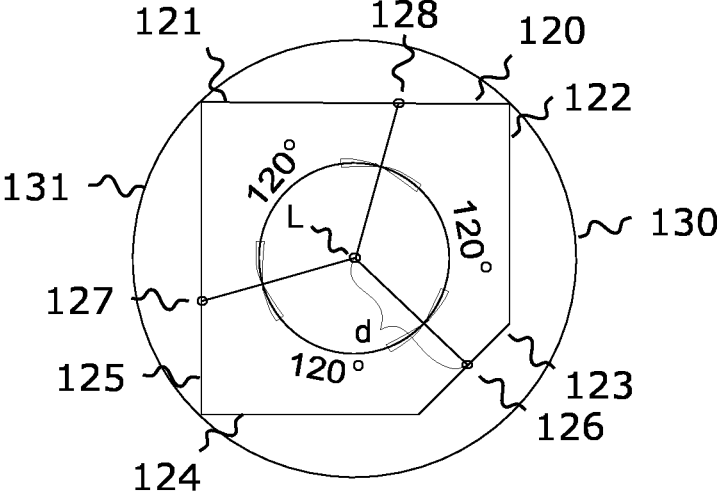
FIG. 3 shows another top view of an embodiment of a tool.

Some examples are now described in more detail with reference to the enclosed figures. However, other possible examples are not limited to the features of these embodiments described in detail. These may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may, in each case, be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 shows a side view of a section of a tool 100. In FIG. 1, substantially only one clamping shank 110 of the tool 100 is illustrated. The tool 100 is a rotary driven tool such as a drill, a tap, a counterbore, a reamer, a thread former, or a milling cutter. Via the clamping shank 110, the tool 100 is clampable into a rotary driving clamping device (not illustrated) such as a tap wrench or a chuck, in particular a three-jaw chuck, a four jaw chuck or a lathe chuck. Via the clamping shank 110 clampable into the clamping device, a torque provided by the rotary driving clamping device may be applied to the tool 100 in order to put the tool in a rotational movement for material processing.

For material processing, the tool 100 comprises a tool head adjoining (e.g., directly adjoining) the clamping shank 110. The tool head adjoins the clamping shank 110 along a longitudinal direction of the tool 100. In FIG. 1, the tool head adjoining the bottom of the clamping shank 110 is not shown because the design of the tool head is irrelevant to the clamping shank 110. The design of the tool head depends on the type of tool. For example, if the tool 100 is a drill, the tool head may be formed as a drill head. Similarly, the tool head may be provided with one or more appropriately shaped cutting edges if the tool 100 is a tap, a counterbore, a reamer, a thread former, or a milling cutter. In this context, however, it is to be noted that the type of tool 100 is not limited to the foregoing examples. Rather, the tool 100 may be any rotary driven tool.

In this case, the tool 100 is integrally formed, i.e., the tool 100 is made from a single piece of material not assembled from several individual parts. For example, the tool 100 may be made of cemented carbide or steel, particularly alloyed tool steel. The tool 100 may be made of, for example, high-speed steel [German: Schnellarbeitsstahl, Hochgeschwindigkeitsstahl], also known as HSS or HS. For example, the tool 100 may be obtained by grinding and/or milling a cemented carbide or steel blank. At least parts of the tool 100 (e.g., the tool head or the clamping shank 110) may further be coated with one or more materials. For example, the tool 100 may be at least partially coated with cobalt, titanium nitride, titanium aluminum nitride, aluminum titanium nitride, or titanium carbon nitride to increase a longevity and/or service life of the tool 100. In this context, however, it is to be noted that the coating of the tool 100 is not limited to the foregoing examples. Rather, the tool 100 may be coated with any suitable material.

As can be seen from FIG. 1, the clamping shank 110 comprises two differently shaped shank portions 120 and 130. The pentagonal shank portion 120 thereby adjoins the circular shank portion 130 along a longitudinal extension of the clamping shank 110 and/or the tool 100. The pentagonal shank portion 120 forms a distal end of the tool 100 (the tool head forms another distal end of the tool 100). Both the pentagonal shank portion 120 and the circular shank portion 130 are configured to be clamped into the clamping device. The pentagonal shank portion 120 has a pentagonal outer contour, while the circular shank portion 130 has a circular outer contour. This is particularly evident from FIG. 2, which shows a top view of the tool 100 and/or the clamping shank 120.

The outer contour of the pentagonal shank portion 120 is defined by the five side faces 121, . . . , 125. The outer contour of the circular shank portion 130 is defined by the side face 131. The circular shank portion 130 extends rotationally symmetrically about a longitudinal axis L of the clamping shank 110. As can be seen from FIG. 2, the pentagonal shank portion 120 does not extend beyond the circular shank portion 130 transverse to the longitudinal axis L. In other words: A maximum perpendicular distance of a point on one of the side faces 121, . . . , 125 of the pentagonal shank portion 120 from the longitudinal axis L of the clamping shank 110 is not greater than a minimum perpendicular distance of a point on the side face 131 of the circular shank portion 130 from the longitudinal axis L of the clamping shank 110 (i.e., not greater than the radius of the circular shank portion 130 with respect to the longitudinal axis L of the clamping shank 110).

An extension of the clamping shank 110 along the longitudinal axis L, i.e. along its longitudinal extension, is (substantially) greater than an extension of the clamping shank 110 in a plane perpendicular to the longitudinal axis L. For example, an extension of the clamping shank 110 along the longitudinal axis L may be at least 3, 5 or 10 times greater than an extension of the clamping shank 110 in a plane perpendicular to the longitudinal axis L.

In the plane shown in FIG. 2, which is perpendicular to the longitudinal axis L of the clamping shank 110, the four contiguous side faces 121, 122, 124 and 125 each form an angle of 90° to each other. In other words: The (interior) angles $\alpha_1$, $\alpha_2$, and $\alpha_5$ spanned by respective adjacent pairs of the four contiguous side faces 121, 122, 124 and 125 are each 90° in the plane perpendicular to the longitudinal axis L of the clamping shank 110. The fifth side face 123 form in the plane respectively an (interior) angle $\alpha_3$ and/or $\alpha_4$ of greater than 90° with the side faces 122 and 124 adjacent thereto. In the embodiment shown in FIG. 2, the fifth side face 123 form in the plane respectively an angle $\alpha_3$ and/or $\alpha_4$ of 135° with the side faces 122 and 124 adjacent thereto. It this case, it is to be noted that the values for the angles $\alpha_1$, . . . , $\alpha_5$ between respective adjacent side faces of the side face 121, . . . , 125 of the pentagonal shank portion 120 are selected purely by way of example, and other values for the angles $\alpha_1$, . . . , $\alpha_5$ may also be selected in accordance with further embodiments.

The design of the clamping shank 110 according to the invention allows the tool 100 to be clamped into various clamping devices. In this case, the pentagonal shank portion 120 allows the tool 100 to be received and clamped into a triangular as well as a square receptacle of the clamping device, in particular. For example, due to the pentagonal shank portion 120, the tool 100 may be received in a tap wrench or a chuck having three and/or four jaws. Due to the design of the clamping shank 110 according to the invention, the tool 100 may therefore be used universally with various rotary driving clamping devices. For example, the tool 100 may therefore be used with clamping devices commonly used in the industry as well as in the workshop and/or during assembly, as well as in private households.

The tool 100 may be manufactured with substantially unchanged production effort compared to tools with ordinary clamping shank. For example, essentially the production process for a square clamping shank may be adopted and supplemented in that one of the four corners is flattened in order to obtain the fifth side face 123 and thus the pentagonal shank portion 120. Compared to the production process for the square clamping shank, the additional effort is minimal.

Due to the present invention, a tool manufacturer has to produce fewer tool variants, as the tool 100 is usable universally for different clamping devices due to the design of the clamping shank 110 according to the invention. Accordingly, a tool manufacturer does not have to produce and store a variant of the tool with a corresponding shank adjusted to the respective clamping device. As there is no longer a need to produce a large number of tool variants for different clamping devices, a manufacturer may save energy, material as well as other manufacturing costs. Accordingly, the design of the clamping shank 110 according to the invention may also save storage and/or logistics costs for a manufacturer of the tool. Likewise, the effort and/or cost for a purchaser of the tool 100 may be reduced as the tool is universally usable for various clamping devices due to the design of the clamping shank 110 according to the invention.

Due to the circular shank portion and the pentagonal shank portion, the clamping shank according to the invention enables the tool to be clamped into various rotary driving clamping devices, in particular by a corresponding design of the pentagonal shank portion. For example, due to the clamping shank according to the invention, the tool may be clamped into a round chuck, a three-jaw chuck as well as a four jaw chuck. The clamping shank according to the invention thus allows the tool to be used universally.

FIG. 3 also shows again explicitly how the clamping shank 110 may be received in a three-jaw chuck. FIG. 3 shows a supplemented top view of the tool 100 and/or the clamping shank 110. As can be seen from FIG. 3, the pentagonal shank portion 120 has three points 126, 127, and 128 that have an equal perpendicular distance d from the longitudinal axis L of the clamping shank. The three points 126, 127 and 128 are located on the three side faces 121, 123 and 125 of the pentagonal shank portion 120. One of the three points 126, 127 and 128, namely point 126, is located on the side face 123 of the pentagonal shank portion 120, which respectively forms an angle $\alpha_3$ and/or $\alpha_4$ of greater than 90° with the side faces 122 and 124 adjacent thereto. The other two points 127 and 128 lie on the side faces 121 and 125, which form an angle $\alpha_1$ of 90° to each other.

FIG. 3 also shows three imaginary connecting lines between the longitudinal axis L and a respective one of the three points 126, 127, and 128. The three imaginary connecting lines lie in the plane perpendicular to the longitudinal axis L of the clamping shank 110 and each form an angle of 120° to each other in the plane.

A three-jaw chuck may grip the clamping shank 110 at the points 126, 127, and 128 in order to clamp the clamping shank 110. Accordingly, torque may be applied from the chuck to the tool 100 via the clamping shank 110 via the points 126, 127, and 128 to cause the tool 100 to rotate for material processing.

Optionally, a (small) recess [German: Vertiefung, Aussparung] may be made in the clamping shank 100 at the points 126, 127 and 128 respectively (not shown in FIG. 3) so that the three-jaw chuck may engage in the recesses and thus grip the clamping shank 110 better. For example, the size of the recesses at the points 126, 127 and 128 may be selected depending on the size of the clamping shank 110 and/or the tool 100. The shape of the recesses at the points 126, 127, and 128, for example, may be substantially circular or wedge-shaped. It is to be noted, however, that the recesses at the points 126, 127 and 128 are not limited in terms of their shape as well as their size—in particular not to the aforementioned examples. The recesses at the points 126, 127, and 128 may be made with little manufacturing effort and may enable an improved reception of the clamping shank 110 and/or tool 100 by the three-jaw chuck.

Although not explicitly shown in any of the FIGS. 1 to 3, the clamping shank 110 may be received in a four-jaw chuck in an analogous manner. A respective length of each of the side faces 121, 122, 124 and 125 in the plane perpendicular to the longitudinal axis L of the clamping shank 110 is more than 50% of the length of the longest of the side faces 121, 122, 124, and 125. Accordingly, the four-jaw chuck may grip four points on the four side faces 121, 122, 124, and 125 of the pentagonal shank portion 120 that are an equal perpendicular distance from the longitudinal axis L of the clamping shank. Imaginary connecting lines between the longitudinal axis L and a respective one of the three points lie, similarly again, in the plane perpendicular to the longitudinal axis L of the clamping shank 110 and form in each case an angle of 90° to each other in the plane.

Similarly, a three-jaw chuck, a four-jaw chuck, or a round chuck may also grip the circular shank portion 130 to clamp the tool 100.

By means of the clamping shank 110 according to the invention, for example, a machine drill, tap or counterbore or also any other rotary driven tool with high torque may be used universally.

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects in the previous sections have been described in relation to a device or system, these aspects should also be understood as a description of the corresponding method. In this case, for example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A tool comprising:
a clamping shank; and
a tool head for material processing adjoining the clamping shank,
wherein the clamping shank comprises:
  a circular shank portion; and
  a pentagonal shank portion adjoining the circular shank portion,
wherein the pentagonal shank portion forms one distal end of the tool, and the tool head forms the other distal end of the tool,
wherein the circular shank portion is between the pentagonal shank portion and the tool head,
wherein the pentagonal shank portion, the circular shank portion, and the tool head form an integral monolithic component made from a single piece of material,
wherein four contiguous side faces of the pentagonal shank portion each form an angle of 90° to each other in a plane perpendicular to a longitudinal axis (L) of the clamping shank, and a fifth side face of the pentagonal shank portion forms in said plane angles of greater than 90° with each of the adjacent side faces of the pentagonal shank portion.

2. The tool of claim 1, wherein the circular shank portion extends rotationally symmetrically about the longitudinal axis (L) of the clamping shank, wherein the pentagonal shank portion has three points which have an equal perpendicular distance (d) to the longitudinal axis (L) of the clamping shank, wherein the three points are located on three different side faces of the pentagonal shank portion, and wherein imaginary connecting lines between the longitudinal axis (L) and a respective one of the three points lie in a plane perpendicular to the longitudinal axis (L) of the clamping shank and each form an angle of 120° to each other in said plane.

3. The tool of claim 2, wherein one of the three points is on the fifth side face of the pentagonal shank portion.

4. The tool of claim 1, wherein the fifth side face of the pentagonal shank portion forms an angle of 135° in the plane with each of the adjacent side faces of the pentagonal shank portion.

5. The tool of claim 1, wherein the circular shank portion extends rotationally symmetrically about the longitudinal axis (L) of the clamping shank, wherein a maximum perpendicular distance of a point on a side face of the pentagonal shank portion to the longitudinal axis (L) of the clamping shank is not greater than a minimum perpendicular distance of a point on a side face of the circular shank portion to the longitudinal axis (L) of the clamping shank.

6. The tool of claim 1, wherein the pentagonal shank portion adjoins the circular shank portion along a longitudinal extension of the clamping shank.

7. The tool of claim 1, wherein the tool is a drill, a tap, a counterbore, a reamer, or a thread former.

\* \* \* \* \*